Feb. 2, 1971  R. RODRIGUEZ  3,560,314
THREE-DIMENSIONAL PAINTED WORKS OF ART
Filed June 27, 1969
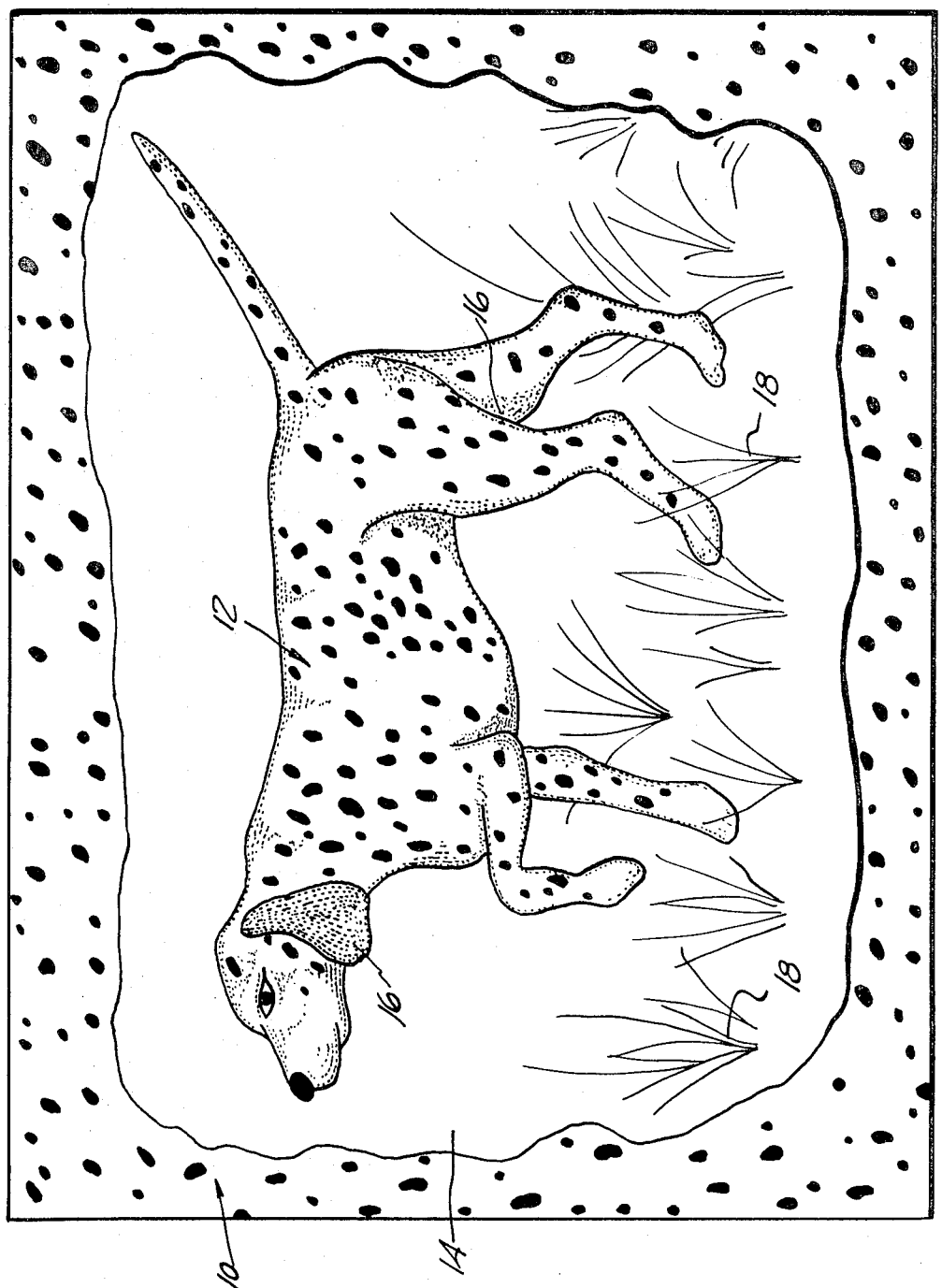
INVENTOR
ROBERT RODRIGUEZ
BY Cullen, Sloman, & Cantor
ATTORNEYS 3,560,314
THREE-DIMENSIONAL PAINTED WORKS OF ART
Robert Rodriguez, Westland, Mich., assignor to
Handcraft Studio, Inc., Detroit, Mich.
Filed June 27, 1969, Ser. No. 837,157
Int. Cl. B44f 3/00
U.S. Cl. 161—20      2 Claims

ABSTRACT OF THE DISCLOSURE

A representation of a selected animal is formed by transferring a silhouette of such animal to a textured simulated animal skin having the appropriate markings for such animal, painting over said markings throughout a wide border surrounding the outline of the silhouette, thereby revealing and defining the animal within the border, and finally applying additional paint to complete the appropriate shading and details on the animal and border.

This invention relates to painted works of art.

BRIEF DESCRIPTION OF THE DRAWING

The figure is a front view of a painting made in accordance with the present invention.

DETAILED DESCRIPTION OF INVENTION

Referring to the figure, the novel method of making a painted work of art described herein begins with a piece of synthetic or simulated animal skin 10. The illustrated skin represents that of a Dalmatian breed of dog, having black spots on a white background. Such simulated skins are commercially available, and comprise an unwoven cotton or other material which is applied to a supporting fabric base, and which has a simulated animal skin pattern printed thereon, employing appropriate colors. The selected material and manner of fabricating the product also provide a realistic texture, as well as appearance.

The particular material used for the synthetic skin and the particular pattern portrayed thereon does not form a part of this invention. Among other such skins presently available are those simulating skins of a tiger, leopard, pinto pony and zebra.

Skin 10 is first cut to the desired size, such as 36" x 48", and stretched over a frame. A rigid cardboard or wood silhouette of the appropriate animal in a natural skin pose is then temporarily layed onto the stretched skin, and the perimeter of the silhouette traced or otherwise transferred onto the skin itself. One method of transferring the silhouette perimeter which has been used is to employ a spray-applied quick-drying enamel. This produces an outline on skin 10 corresponding to that of dog 12 in the figure.

Next, a wide opaque border 14 is applied around the outside of the silhouette outline. A formula which has been used successfully for this purpose is a mixture of two-thirds acrylic modeling paste plus one-third acrylic paint. The modeling paste dries clear, and provides the desired thickness. It can be applied with a brush or by using the edge of a piece of cardboard like a putty or palette knife. The purpose of border zone 14 is to locally conceal the animal skin pattern from this area, to thereby reveal and define the silhouette of animal 12. Within the silhouetted area, the natural skin markings of the animal are provided by basic skin 10.

Next, preferably using acrylic paint, appropriate details and shading 16 are applied to skin 10 to complete the three-dimensional illustration of dog 12. In this case, for example, black paint would be applied to form the nose, ears, eyes and shading, and white paint to eliminate black spots as around the muzzle. Similarly, additional paint would be applied to border zone 14 as at 18 to provide a realistic environmental scene for the particular animal portrayed. Such additional art work could be as complete and elaborate as desired.

As shown in the figure, the perimeter of the painting beyond border 14 may be left in its original condition if desired, so that the animal skin markings show around the outside of the border zone for additional interest. Alternatively, all of the skin except for animal 12 may be painted over.

This invention may be further developed within the scope of the following claims. Accordingly, the above specification is to be interpreted as illustrative of only a single operative embodiment of this invention, rather than in a strictly limited sense.

I now claim:
1. The method of making a painted work of art on a textured simulated animal skin which comprises the steps of:
   temporarily overlaying on the front of the simulated skin a natural pose silhouette of the animal species whose skin markings are embodied in said skin;
   transferring the outline of said silhouette to said skin;
   applying a wide border of opaque paint to said skin around the outside of said silhouette outline to conceal the skin markings in said border zone and to thereby reveal and define the silhouette of the animal, with its natural markings provided by said skin;
   and applying further paint in appropriate places to complete the details and shading on the animal and to provide an appropriate environmental scene on said border zone.
2. A painted work of art comprising: a textured simulated animal skin provided with the skin markings of a selected animal species, said markings being covered by opaque paint throughout a border zone which surrounds the outline of a naturally posed animal, thereby revealing and defining the silhouette of such animal within said border zone, and additional paint being applied to the animal silhouette and said border zone to provide appropriate shading and details.

References Cited

UNITED STATES PATENTS

| | | | |
|---|---|---|---|
| 3,427,176 | 2/1969 | Moriya | 161—19X |
| 3,046,686 | 7/1962 | Fogle | 117—45X |
| 3,434,861 | 3/1969 | Luc | 117—37X |

FOREIGN PATENTS

| | | | |
|---|---|---|---|
| 548,713 | 10/1922 | France | 161—20 |

PHILIP DIER, Primary Examiner

U.S. Cl. X.R.

117—37, 45; 161—116, 138